United States Patent [19]

Parolin

[11] 3,965,311

[45] June 22, 1976

[54] SWITCHING APPARATUS RESPONSIVE TO MOVEMENT IN FIRST AND SECOND OPPOSED DIRECTIONS FOR ESTABLISHING FIRST AND SECOND DIFFERENT INTERCONNECTIONS

[75] Inventor: John J. Parolin, South Boston, Mass.

[73] Assignee: Cole-Hersee Company, South Boston, Mass.

[22] Filed: Dec. 30, 1974

[21] Appl. No.: 537,349

Related U.S. Application Data

[62] Division of Ser. No. 335,779, Feb. 26, 1973, Pat. No. 3,902,159.

[52] U.S. Cl. ............................ 200/16 C; 200/17 R; 200/153 V
[51] Int. Cl.² .................... H01H 15/10; H01H 3/12
[58] Field of Search ............ 200/153 V, 16 R, 16 C, 200/16 D, 16 B, 17 R, 76–78, 159 R, 160, 161, 329–331, 340

[56] References Cited
UNITED STATES PATENTS

| 1,244,110 | 10/1917 | McNary ................... 200/153 V UX |
| 2,100,657 | 11/1937 | Edwards ............................ 200/16 C |
| 3,267,226 | 8/1966 | Shaw et al. ........................ 200/16 C |
| 3,676,618 | 7/1972 | Bartens et al. ........................ 200/77 |

*Primary Examiner*—James R. Scott
*Attorney, Agent, or Firm*—Charles Hieken; Jerry Cohen

[57] ABSTRACT

A multi-circuit switch is operated by a plunger which momentarily disconnects one set of contacts only during its inward travel as the result of unique coaction between a shaped enlargement on the plunger, an elastomeric O-ring closely surrounding and rideable over the enlargement of the plunger, and an apertured springbiased pole-carrying plate through which the plunger but not the O-ring will pass.

7 Claims, 9 Drawing Figures

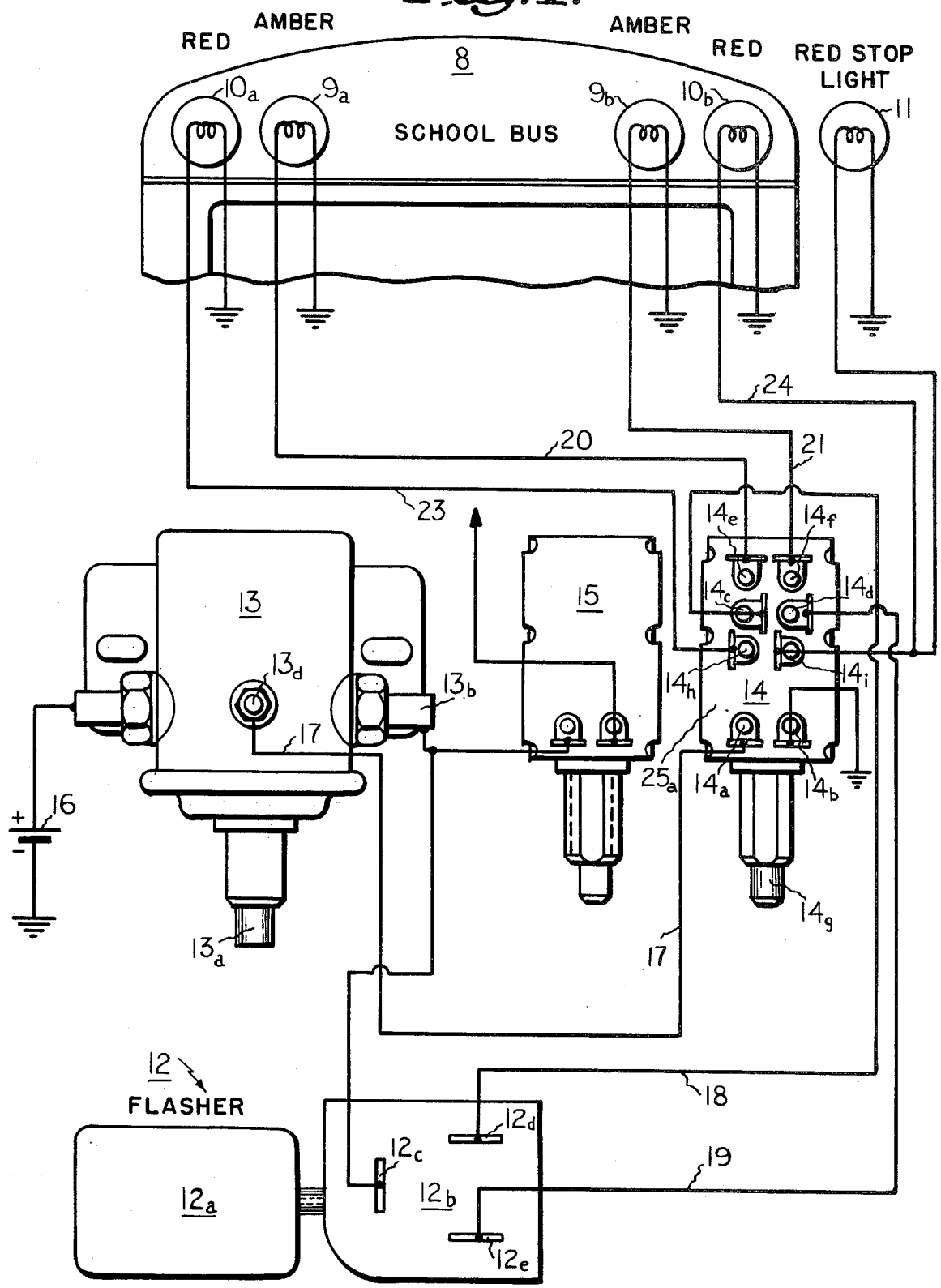

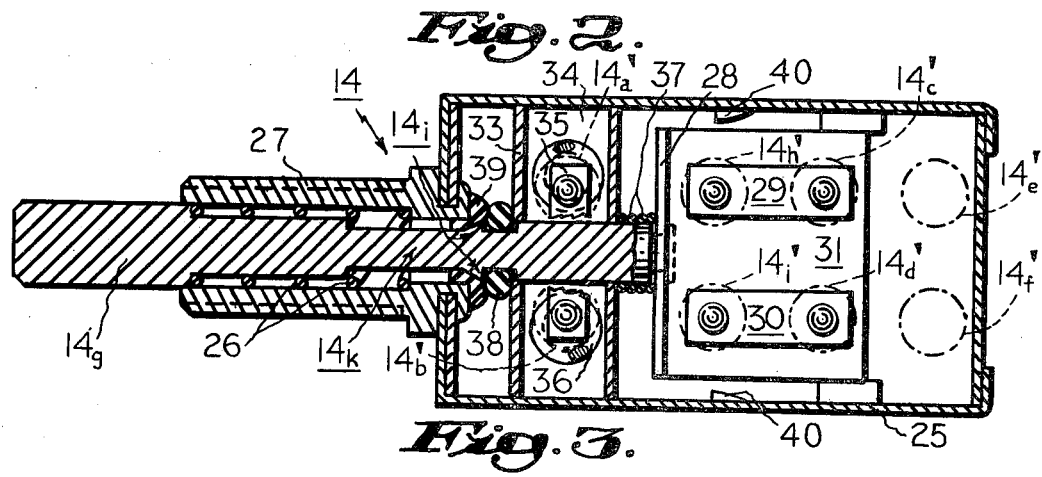
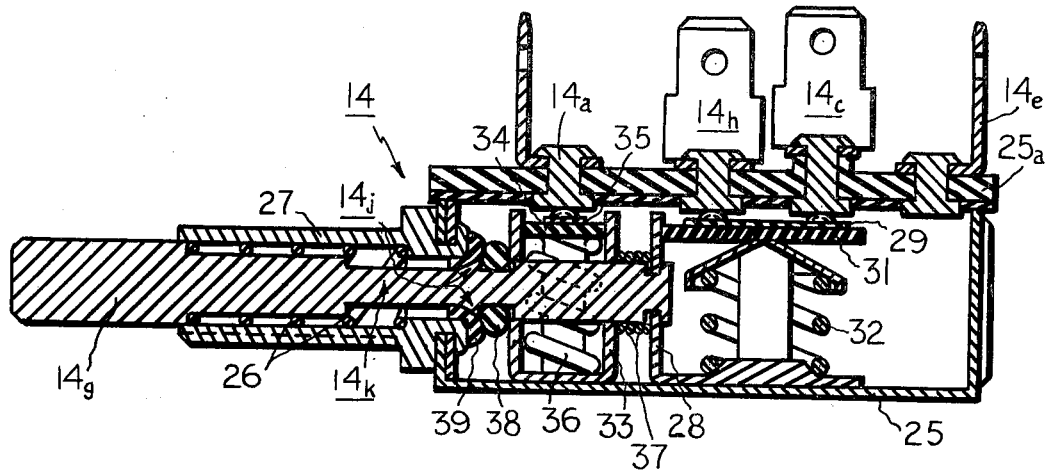
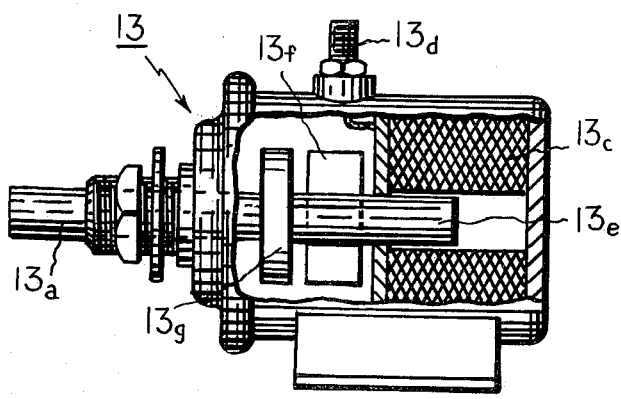

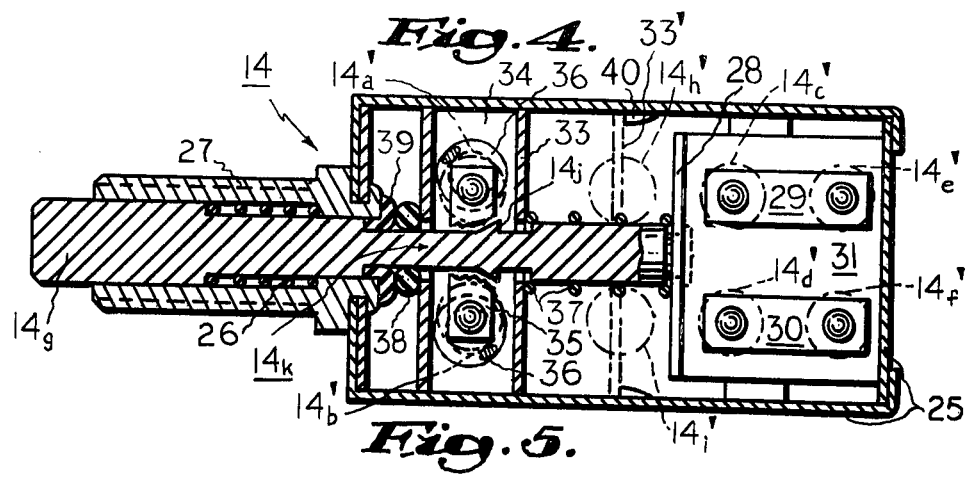
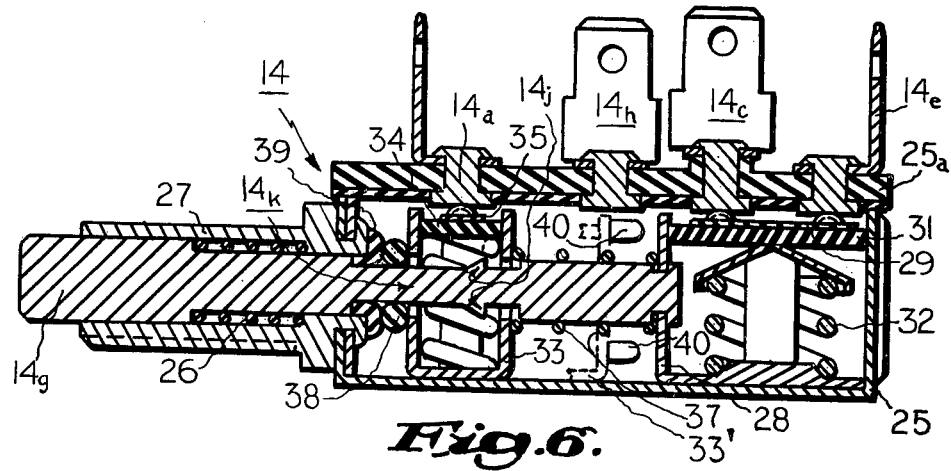
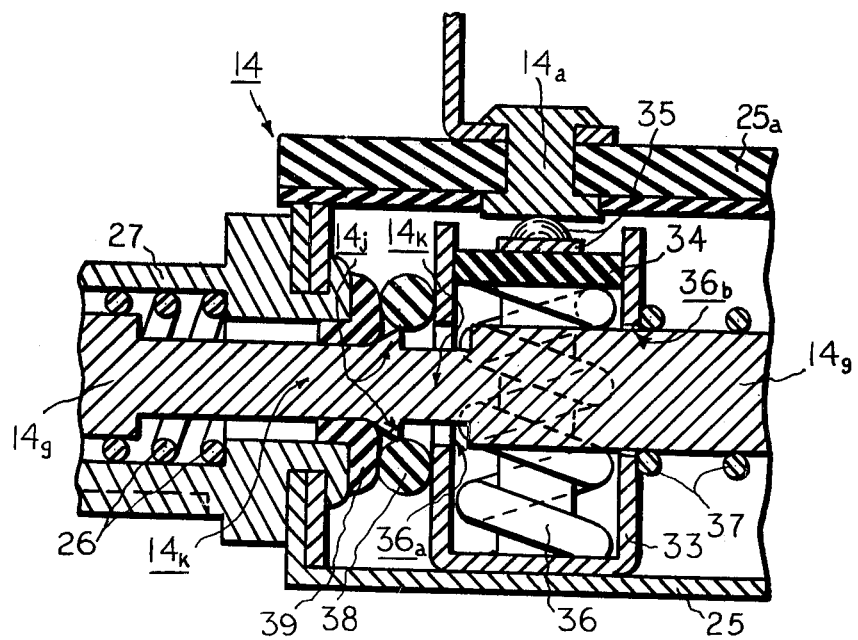

SWITCHING APPARATUS RESPONSIVE TO MOVEMENT IN FIRST AND SECOND OPPOSED DIRECTIONS FOR ESTABLISHING FIRST AND SECOND DIFFERENT INTERCONNECTIONS

This is a division of application Ser. No. 335,779, filed Feb. 26, 1973, now Pat. No. 3,902,159 granted Aug. 26, 1975.

BACKGROUND OF THE INVENTION

The present invention relates to improvements in electrical switching apparatus such as is used in controlling warning lights aboard school buses and the like, and, in one particular aspect, to novel and improved switching arrangements for operator-selected control over certain automatic door-actuated excitations of warning lights, as well as to unique momentary-interrupting switch constructions which are especially suited to the requirements of such switching arrangements.

A conventional attention-commanding safety warning-light system for school buses involves the flashing of amber warning lights as the vehicle approaches a stop, and then the flashing of red stop lights so long as the door or doors are open to permit the boarding or discharge of passengers. Preferably, such a system is under control of a door-operated switch which will insure that the stop lights must operate without fail during those hazardous times when passengers may be alighting or entering. However, it is also mandatory that the same vehicle not display flashing stop lights when at rest for other purposes, such as a temporary halt with door open as required by law at a railroad crossing. These conflicting requirements can be satisfied in part by way of a simple type of operator-actuated switching which would disable the warning system, but this introduces another control and device to which an already busy operator must give attention, and there is no assurance that the warning system will always be reset to function when needed. More complex networks, involving additional door-operated switches, for example, tend to introduce significantly higher costs, both as to system components and installation.

In accordance with certain aspects of the present teachings, the creation of a relatively simple and inexpensive warning-light system for school buses, involving only a single door-operated switch unit, which will reliably condition itself for single-cycle automatic sequencing of both flashing warning and stop lights upon actuation by the operator, is linked to the concept of having the door switch momentarily interrupt one of its switching circuits only when the door is being closed after having been opened. That momentary interruption is effective to reset a self-holding solenoid switch by which the operator had initiated one cycle of sequencing of the flashing lights, and, thereafter, the operator may intentionally omit the sequencing by refraining from actuation of the solenoid switch when the bus is to stop for some purpose other than admitting or discharging passengers. Once the system has been operator-conditioned to follow the desired sequencing, however, it will be strictly observed in accordance with door opening and closure, without further operator attention.

The momentary-interrupt switching entailed in the foregoing is unusual in that a single door-actuated plunger must be capable of simply shifting electrical excitation from warning to stop lights during a movement in one direction associated with the opening of the door, and, during its movement in the opposite direction, associated with closing of the door, it must momentarily break another circuit which is nevertheless not interrupted by the other movement.

SUMMARY OF THE INVENTION

According to the invention, there are a plurality of insulatedly separated fixed contact means for connection to external circuits, movable contact means for selectively interconnecting predetermined ones of the fixed contact means, armature means movable in first and second opposed directions for coacting with the movable contact means for establishing a predetermined interconnecting relationship among the fixed contact means, and means coupling the movable contact means to the armature means responsive to movement of the armature means in the first and second directions for establishing first and second different interconnecting relationships, respectively, among the fixed contact means. According to a more specific aspect of the invention, the first interconnecting relationship includes keeping a first predetermined pair of fixed contact means interconnected by the movable contact means independently of the armature means position and the second interconnecting relationship includes the interruption of the interconnection between the first predetermined pair of fixed contact means. The switching apparatus according to the invention also preferably includes means responsive only to the position of the armature means for selectively interconnecting a second predetermined pair of the fixed contact means.

In achieving the desired momentary interruption of one set of contacts of the door-responsive switch only during an inward plunger travel associated with closing of the door, the plunger is shaped to exhibit a shoulder just smaller than the surrounding mated opening through a plate of a contact carrier which cooperates with those particular contacts. Further, a stretchable O-ring is disposed around the plunger, its inner diameter being less than the outer diameter of the shoulder, and its middle diameter being greater than the diameter of the plate opening. In its outwardly-extended position, the plunger traps the O-ring between its shoulder and the plate, and, as the plunger is moved inwardly during a door-closing movement, the O-ring necessarily pushes the plate inwardly and separates its shorting contact from the stationary contacts of the interrupt circuit under consideration. That separation is only momentary, however, because continued inward travel of the plunger causes the contact plate to strike mechanical stops and the plunger shoulder is then forced to push its way through the O-ring. At that time, the O-ring stretches annularly and rides over the plunger shoulder, whereupon the contact-carrier plate then becomes freed of plunger restraint and is quickly spring-actuated back to its initial position where it again closes with the stationary contacts. When the plunger is later extended outwardly once more, during a door-opening cycle of its movements, the O-ring is rolled back over the plunger shoulder, the latter having a gradual taper promoting that action, and into a readied position between the shoulder and plate once again; there is no interruption of contact connections during the last-described movement of the plunger, because the contact-carrier plate is not disturbed by the rollback interaction between the plunger shoulder and O-ring.

Accordingly, it is one of the objects of the present invention to provide novel and improved vehicle warning-signal switching apparatus of low-cost and uncomplicated construction which responds to operator actuation by automatically imposing a sequencing of light flashings until a vehicle door has been both opened and reclosed.

Another object is to provide unique and advantageous switching for school-bus light-flashing wherein a prescribed sequencing of warning-and stop-light connections is assured by the cooperative relationships of an operator-actuated self-holding switch and a door-actuated switch which develops a momentary interrupt only during a door-closing operation.

A yet further object is to provide a plunger-operated switch wherein an expandable O-ring, an apertured contact-carrying plate, and a shaped shoulder on the plunger cooperate to produce a transient separation of certain switching contacts only during travel of the plunger in one of its two directions of reciprocal motion.

BRIEF DESCRIPTION OF THE DRAWINGS

Although the features of this invention which are considered to be novel are expressed in the appended claims, further details as to preferred embodiments, as well as to further objects and advantages, may be most readily comprehended through reference to the following description taken in connection with the accompanying drawings, wherein:

FIG. 1 illustrates an improved school-bus light-flashing switching arrangement, in partly schematic and pictorial conventions;

FIG. 2 is a partly cross-sectioned plan view of a plunger-actuated multiple-circuit switch, useful in the arrangement of FIG. 1. which includes unique momentary-interrupt provisions for one of its circuits;

FIG. 3 provides a sectioned side view of the switch of FIG. 2;

FIG. 4 is plan view like that of FIG. 1, with the switch plunger shown fully depressed;

FIG. 5 represents a sectioned side view of the switch of FIG. 4;

FIG. 6 provides a detail enlargement of a portion of the switch of FIGS. 2–5, in a sectioned side view;

FIG. 7 depicts a self-holding operator-actuated solenoid switch useful in the arrangement of FIG. 1, with portions broken away and sectioned to expose constructional details.

DESCRIPTION OF THE PREFERRED EMBODIMENTS

Figure 8:
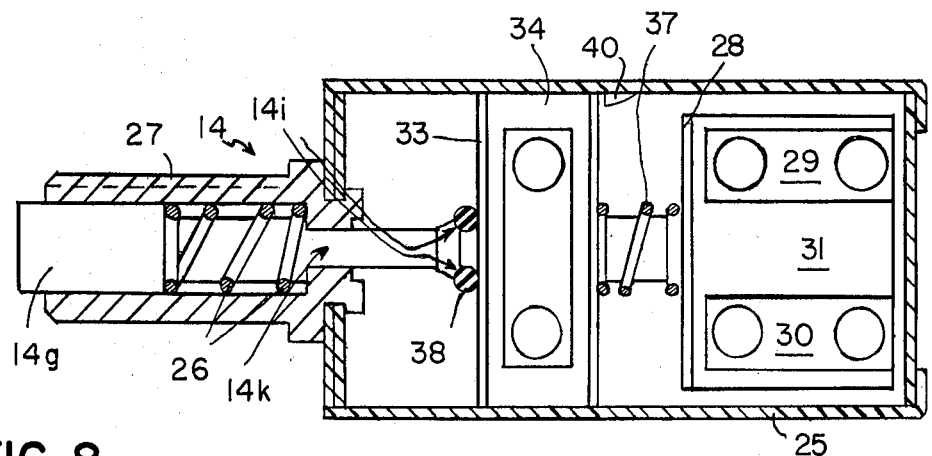
FIGS. 8 and 9 are top and side sectional views showing the plunger at the approximate point where it disengages from the slidable O-ring.
Figure 9:
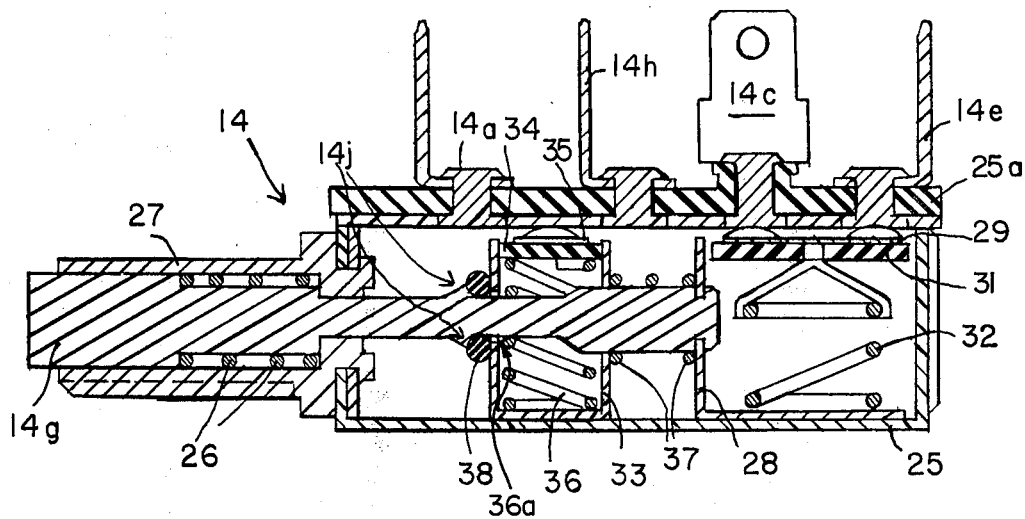

Referring to the drawings, wherein like reference characters are used for corresponding parts throughout the several views, the improved switching arrangement is represented in association with school-bus warning and stop lights, in FIG. 1. There, an upper rear portion 8 of a school bus is shown to include the customary pairs of amber warning lights, 9a and 9b, and red stop lights, 10a and 10b, and a further stop light 11 for a side warning flag is also depicted. Both the pairs of warning and stop lights are intended to be flashed alternately, and respectively in succession first as the vehicle decelerates toward a stop for boarding or discharging passengers and then as a door is opened. For these purposes, a conventional motorized flasher, 12, including a battery-powered motor 12a and commutator-type switch 12b, is employed to distribute power to the warning and stop lights, and the arrangement further includes an operator-actuated self-holding relay switch 13 and a multiple-circuit door-actuated switch 14. When a side warning flag is used, a further single-pole single-throw momentary switch 15 serves to make an electrical connection to a vacuum relay.

As the operator approaches a stop for the boarding or discharge of passengers, the shaft 13a of switch 13 is depressed, thereby establishing electrical continuity between the positive supply of the vehicle battery 16 and an output switch terminal 13b. From the latter connection, excitation is delivered to terminal 12c of the flasher combination 12, causing motor 12a to rotate and commutate the battery power alternately to flasher terminals 12d and 12e. At the same time switch shaft 13a is depressed against internal spring biasing, an internal self-holding coil within it, 13c in FIG. 7, becomes energized by way of its connections with output terminal 13b and a further terminal, 13d, which is grounded through lead 17 and the normally-closed momentary-interrupt pair of switch contacts 14a and 14b of door switch 14, the contact 14b being grounded. Coil 13c thereby maintains the shaft 13a in the depressed condition wherein its associated contacts establish continuity of electrical supply to the flasher combination 12. Because of this arrangement, even a transient interruption of the connection between normally-closed door-switch contacts 14a and 14b will cause the self-holding relay 13 to spring open and cease excitation of the flasher and lights until shaft 13a is once again depressed by the operator.

In the aforementioned sequencing wherein the operator has initially actuated relay shaft 13a and thereby started the motor-flasher commutation, the flasher terminals 12d and 12e alternately excite the amber warning-signal lights 9a and 9b through leads 18 and 19, switch contacts 14c and 14d, switch contacts 14e and 14f, and leads 20 and 21. The necessary individual closures between contacts 14c and 14e, and between 14d and 14f, are established by shorting contact bars carried at the inner end of plunger 14g of that switch, when it is fully depressed by closure of a vehicle main door. Subsequently, opening of the door, after the bus has stopped, allows the plunger 14g to be sprung to an outwardly-extended position, and the shorting contacts then also move forward and thereby establish new connections between contact 14c and 14h and between 14d and 14i. Leads 22 and 23, joined with the pair of contacts 14h and 14i, respectively, then convey the excitations from commutation terminals 12d and 12e to the red stop lights 10a and 10b, such that they flash in alternation so long as the bus remains stopped with its main door open.

Importantly, all of the signalling is to be terminated only upon reclosure of the door, subject to wholly automatic recycling only if the operator once again intentionally depresses plunger 13a of the self-holding switch 13. In that connection, the continuity between contacts 14a and 14b of door-switch 14 becomes critical, inasmuch as depression of the plunger 14g by a closing door must at least momentarily interrupt that continuity while, in subsequent return movement of that plunger upon opening of the door, there must be no such interruption. A preferred construction of a suitable multi-circuit switch, operated by the door, and including unique provisions for the aforesaid one-way momentary interruption of one of the circuits, appears in FIGS. 2–6.

In certain instances when the same vehicle is to be stopped and the main door opened for reasons other than permitting passengers to enter or leave, the above-described sequencing of light flashings must be avoided. The operator then need only omit actuation of the relay switch 13, and only the usual brake-operated stop lights will then respond. Stops at railroad crossings, as required by law, can therefore be made without violating statutes prohibiting the flashings of amber and red lights except in connection with school-bus stops serving passengers.

As is represented in FIGS. 1–6, the door-operated switch 14 includes a generally rectangular form of metal housing, 25, capped by an insulating cover, 25a, from which the terminals for switch contacts 14a–14f and 14h and 14i extend outwardly for purposes of connection in the switching circuits which have been described. Door-actuated plunger 14g is urged toward its outwardly-extended condition, shown in FIGS. 2 and 3, by a coiled spring 26 trapped between that plunger and its surrounding guide-bushing 27 mounted at the front end of the switch. The innermost end of plunger 14g is secured to a longitudinally-slidable saddle 28 on which two side-by-side contact bars, 29 and 30, of conductive material are supported in insulated relationship by a contact carrier member 31. When the switch plunger is fully extended (FIGS. 2, 3 and 6), as allowed by an open-door condition, the attached saddle 28 is likewise in a forward position, where the contact bars 29 and 30 respectively engage the left set of contacts 14c and 14h and the right set of contacts 14d and 14i. Full depression of plunger 14g, upon closure of the door with which the switch is associated, causes the saddle 28 to slide to a rearmost position (FIGS. 4 and 5) at which the contact bars 29 and 30 respectively engage the left set of contacts 14c and 14e and the right set of contacts 14d and 14f. Carrier member 31 is biased upwardly, by action of entrapped spring 32, such that good electrical contacting can be realized while at the same time allowing the contact bars to be slid between the forward and rear switching positions. Locations of the aforesaid sets of top-mounted contacts are designated by dashed linework and related reference characters having distinguishing single-prime accents in FIGS. 2 and 4, where cover 25a is removed to expose internal features of construction.

A further saddle, 33, is disposed within the housing 25, between saddle 28 and the front end of the housing, and supports an insulating carrier 34 for a transversely-extending contact bar 35 associated with the contact pair 14a–14b. Unlike saddle 28, the further saddle 33 is not fixed with plunger 14g, but is instead slidable in relation to it because of a slight enlargement of the openings through that saddle 33 in relation to external diametric dimensions of the internally-mated plunger. Springs such as springs 36 urge the contact carrier 34 and contact bar 35 upwardly, for engagement with the contact pair 14a–14b, and spring 37 between saddles 28 and 33 tends to maintain saddle 33 in the illustrated forward position where its contact bar 35 connects the contact pair 14a–14b. For purposes of clarity in FIGS. 2 and 4, the contact bar 35, shown partly broken away, and the saddle 31 with its contact carrier and contact bars, are superimposed in full-line view over what would otherwise be cross-sectioned parts of the switch. Normally, spring 37 between the two saddles tends to hold saddle 33 in the forward position irrespective of whether door-actuated plunger 14g is in the fully-extended position (FIGS. 2 and 3) or fully-depressed position (FIGS. 4 and 5). And, once the plunger has been fully depressed (FIGS. 4 and 5), it may thereafter extend itself fully outwardly (FIGS. 2 and 3), upon opening of the associated door, without interference with the saddle 33 then in its forward position, because the accommodating front and rear saddle openings 36a and 36b (FIG. 6) through which the plunger passes are both of larger diameter than any mating parts of that plunger. However, as the plunger is gradually depressed from the forward position (FIGS. 2 and 3) toward the fully-depressed position (FIGS. 4 and 5) the saddle 33 is first pressed and moved rearwardly, along with the plunger, because of an interference which exists between it and an elastically-expandable O-ring 38 and a shaped enlargement 14j on a reduced-diameter portion 14k of the plunger.

The rear annular face of enlargement 14j is substantially transverse to the axis of plunger 14g, or may be only slightly inclined, whereas its forward surface (to the left in FIGS. 2–6) is preferably more tapered or frustro-conical. O-ring 38 has an inner diameter, in place about reduced-diameter plunger portion 14k, which is about the same as said reduced diameter, and has an outer diameter in excess of the diameter of the front opening 36a through saddle 33. Further, the radial thickness of enlargement 14j is preferably less than one-half the annular thickness of O-ring 38, and the diameter of saddle opening 36a is preferably less than that of the circular middle of the O-ring in its position around reduced portion 14k. The latter relationships tend to prevent jamming of the O-ring between the plunger enlargement and saddle, as well as to prevent the O-ring from being squeezed through the saddle opening 36a. A bushing 39, provides a front stop against which the O-ring may rest at times when it is in a stationary dwell condition.

In line with what has been mentioned hereinabove, rearward movement of plunger 14g, upon closing of the associated door, causes enlargement 14j to press against O-ring 38, and the latter in turn presses against the front of saddle 33, such that the entire saddle 33 is forced rearwardly and its contact bar 35 thus momentarily separates itself from and interrupts continuity between circuit contacts 14a and 14b. That interruption continues only until the rear of saddle 33 engages mechanical stops in its rearward travel, such stops being shown in the form of shallow punched-metal tabs 40 projecting inwardly from the sides of the housing 25 (FIGS. 2, 4 and 5). These tabs are disposed far enough rearwardly of the forward position of saddle 33 to permit the latter to move rearwardly without obstruction until the contact bar 35 is positively disengaged from the associated contacts 14a and 14b, a typical rearmost orientation of the rear of saddle 33 being shown in dashed linework 33 in FIGS. 4 and 5. Once these stop tabs are engaged by saddle 33, and rearward movement of the latter is halted, the continuing rearward thrust of the rear face of plunger enlargement 14j against the inner portions of O-ring 38 cause the latter to be expanded diametrically and to ride forward over that enlargement. That ride-up expanding action is illustrated in its initial stage for O-ring 38 in FIG. 6, although it will of course be understood that the plunger and saddle would in fact be displaced more rearwardly (i.e., to the right) than actually shown in that enlargement which was aimed at clarification of constructional details. Radially-outward squeezing of the inner part, and consequent diametric expansion, of the O-ring 38, follows necessarily from the facts that it cannot pass through saddle opening 36a, and that all squeezing is confined to the radially inner portions of the O-ring. Once the O-ring has been expanded in this fashion it ceases interfering with plunger movement and rolls forward over the frusto-conical front surface of enlargement 14j, allowing the plunger to advance to its rearmost position (FIGS. 4 and 5) and allowing the spring 37 to snap the saddle 33 forward to the position at which its contact bar 35 once again engages contacts 14a and 14b, as desired. During return of the plunger to a fully-extended position (FIGS. 2, 3 and 6) as the door is opened, the O-ring rests against bushing 39 while the frustro-conical front of enlargement 14j is pulled through it by action of the plunger return spring 26, with the result that the O-ring expands, rides over the enlargement 14j, and once again locates itself between the enlargement and saddle 33 in readiness for a subsequent momentary-interrupt action when the closing door depresses plunger 14g.

Self-holding relay switch 13 may be of the general type illustrated in FIG. 7, and including a solenoid coil 13c which holds the armature end 13e of its plunger 13a in a rear fully-depressed position once the plunger 13a has been depressed by the operator and until the connection between the aforementioned switch contacts 14a and 14b has been momentarily interrupted during closure of a door. A plunger-return spring, not shown, then re-extends the plunger 13a to ready it for a subsequent actuation by the operator. For the purposes which have been described hereinabove, the solenoid winding 13c is electrically connected between terminal 13d and an internal side contact, opposite contact 13f, to which the positive side of battery source 16 also becomes connected whenever contact 13f is shorted with said contact (served by termninal 13b) upon bridging of the two by a suitable armature contact 13g movable with the plunger 13a.

The warning system may include a momentary-interrupt switch which is separate from a non-interrupting switch serving the flashing lights, inasmuch as it is not essential that all three circuits be controlled by one switch unit, although that is distinctly advantageous. In other modifications, the momentary interrupt may instead be changed to become a momentary connections, and the switch may be associated with actuations other than by a door. Although an O-ring has been specifically referred to, that element may be fashioned of material other than a rubber, and may have a cross-sectional configuration other than of the usual circular form; a split metal or plastic ring, expandable in response to the applied forces, may be substituted, for example.

Accordingly, modifications, substitutions and variations in relation to the specific embodiments selected for illustration and description will be evident to those skilled in the art, and it is therefore to be understood that these may be effected without departure from the spirit and scope of this invention in its broader aspects and as set forth in the appended claims.

What I claim as new and desire to secure by Letters Patent of the United States is:

1. Switching apparatus comprising a switch housing, a plunger mounted for reciprocating axial movements in relation to said housing, spring means urging said plunger in the one of opposite angular direction which promotes a maximum forward and outward extension of said end from a front of said housing, a contact actuator slidable in said directions within said housing, spring means urging said contact actuator in said one forward direction, said plunger being freely mated axially with said contact actuator by way of an opening therethrough, said plunger having an enlargement along one portion thereof between adjoining portions of lesser cross-section, an expandable ring member coaxial with said plunger and having an inner periphery smaller than the outer periphery of said enlargement and smaller than said opening and having an outer periphery larger than the outer periphery of said enlargement and larger than said opening, said enlargement having a periphery smaller than said opening, both the periphery of said enlargement and the opening extending radially to positions which correspond to less than half the distance from the inner to outer peripheries of said ring member, said ring member being disposed between said contact actuator and a front part of said housing, said enlargement being movable axially with said plunger from a forward position ahead of said front part and ring member to a more rearward position, stop means limiting rearward sliding motion of said contact actuator in relation to said housing beyond a predetermined limited amount, electrical contacts disposed for electrical closure by said contact actuator when in one of its forward and rear positions and for electrical opening when said actuator is in the other of said positions, whereby rearward depression of said plunger causes said enlargement to press said ring member rearwardly and the ring member to slide said actuator rearwardly until the latter is halted by said stop means, whereupon said ring member expands and rides over said enlargement to allow said actuator to be sprung forward, and whereby subsequent forward return of said plunger does not disturb the position of said actuator and said enlargement passes through said ring member as it is held stationary against said front part of said housing.

2. Switching apparatus as set forth in claim 1 wherein said enlargement has a substantially blunt rear surface and a gradually tapered front surface, and wherein said cross-section, said opening, and the outer periphery of said enlargement are substantially circular.

3. Switching apparatus as set forth in claim 2 wherein said contact actuator carries an electrical contact bar thereon, and wherein said electrical contacts comprise a pair of stationary contacts disposed to be engaged by said bar when said actuator is in a forward position and to be separated from said bar when said actuator is moved to a rear position, whereby electrical continuity between said contacts is transiently interrupted when said plunger is depressed rearwardly.

4. Switching apparatus as set forth in claim 2 further comprising a second contact actuator fixed with said plunger within said housing rearwardly of said first-mentioned actuator, said spring means urging said first-mentioned actuator in said forward direction being interposed between said actuators, and further electrical contacts disposed for electrical closure and opening by said second actuator.

5. Switching apparatus as set forth in claim 1 wherein said ring member comprises an expandable O-ring of elastically-deformable material.

6. Switching apparatus as set forth in claim 1 wherein said contact actuator has a front surface, with said opening therethrough, which is substantially transverse to the axis of said plunger and wherein said actuator is fitted closely within said housing for guidance of its sliding movements therein.

7. Switching apparatus for changing electrical circuit connections and momentarily interrupting another circuit in response to openings and closings of a door, comprising a switch housing, a plunger mounted for reciprocating axial movements in relation to said housing, spring means urging said plunger to extend one of its ends preferably of and outwardly from a front of said housing, a first contact carrier fitted closely within said housing for guided sliding movements axially in relation to said plunger, said plunger being freely mated axially with said contact carrier by way of a circular opening therethrough, said plunger having a circular enlargement along one portion thereof between adjoining portions of lesser circular cross-section, said enlargement having a substantially blunt surface facing rearwardly of said housing and a gradually tapering front surface facing toward the front of said housing, an expandable O-ring member coaxial with said plunger and having an inner diameter smaller than the outer diameter of said enlargement and smaller than said opening and having an outer diameter larger than the outer diameter of said enlargement and larger than said opening, said enlargement having an outer diameter smaller than said opening, both the outer diameter of said enlargement and the diameter of said opening being less than the median diameter of said O-ring, said O-ring being disposed between said contact carrier and a front part of said housing, said enlargement being movable axially with said plunger from a forward position ahead of said front part and O-ring to a more rearward position, stop means limiting rearward sliding motion of said contact carrier in relation to said housing beyond a predetermined limited amount, an electrical contact bar carried by said contact carrier, a pair of electrical contacts fixedly supported by said housing in position to be engaged and shorted by said contact bar when said carrier is in a forward location within said housing and to be left unshorted when said carrier is in a more rearward location limited by said stop means, a further contact carrier fixed with and movable with said plunger rearwardly of said first carrier and having contact bars thereon, a spring interposed between said carriers and urging said first carrier toward said forward location, and further sets of electrical contacts fixedly supported by said housing in position to have certain pairs of contacts in said sets shorted by said contact bars when said further carrier is in a forward location and to have other pairs of contacts in said sets shorted by said contact bars when said further carrier is in a more rearward location, whereby depression of said plunger causes said blunt surface to press said O-ring against said first carrier and to slide said first carrier rearwardly until limited by said stop means, with consequent unshorting of said first pair of contacts, whereupon said plunger enlargement expands said O-ring and passes through the same and further rearwardly through said opening, and said first carrier is sprung forwardly by said spring into shorting relation with said pair of contacts, and whereby subsequent forward movement of said plunger by said spring means leaves the location of said first carrier undisturbed and said enlargement passes forwardly through said O-ring while it is held against movement by said front part of said housing.

* * * * *